United States Patent Office 3,701,609
Patented Oct. 31, 1972

3,701,609
APPARATUS FOR AUTOMATICALLY ADDING PRESELECTED PATTERNS OF ELUENT SOLUTIONS TO A CHROMATOGRAPHIC COLUMN AND MONITORING AND COLLECTING ELUTED FRACTIONS
David G. Bailey, 789 St. Davids Ave., Warminster, Pa. 18974
Filed May 13, 1971, Ser. No. 142,952
Int. Cl. B01d 15/08
U.S. Cl. 210—198 C
2 Claims

ABSTRACT OF THE DISCLOSURE

An apparatus for automatically adding eluent solution to a chromatographic column according to a preselected stepwise or gradient addition pattern or combinations of stepwise and gradient addition patterns and for automatically controlling the operation of accessory and eluate monitoring and collecting equipment. A programmer is electrically connected by a number of circuits and relays to a programmer motor, solenoid valves, a pump and accessory and monitoring equipment and is preset to make the proper contacts necessary to accomplish any desired sequence of eluent additions and eluate collections and to monitor the eluates by a variety of instruments.

---

A non-exclusive, irrevocable, royalty-free license in the invention herein described, throughout the world for all purposes of the United States Government, with the power to grant sublicenses for such purposes, is hereby granted to the Government of the United States of America.

This invention relates to an apparatus for automatically and reproducibly adding eluent solutions to a chromatographic column as a series of stepwise additions or as a combination of stepwise and gradient additions. More particularly, it relates to an apparatus for adding eluent solutions to a chromatographic column according to a preselected pattern of addition or gradients. Still more particularly, it relates to an apparatus for controlling not only the addition of eluents to a chromatographic column but for controlling also several accessory units used in conjunction with the operation of the chromatographic column and with obtaining data from the eluted fractions. The accessory units include a fraction cutter, an ultraviolet monitor, magnetic stirrers, a pump and a programmer motor. When needed for a particular purpose, other accessory units can be included.

Although specialized eluent addition devices are available, their applications and usefulness are limited. The apparatus of this invention can perform a variety of operations and can be adapted to changing chromatographic needs. The patterns of eluting materials from the chromatographic column can be preset and the complete operation including taking fractions and monitoring the eluted fractions is automatic.

An object of this invention is to provide an apparatus that will automatically add eluting solutions to a chromatographic column for stepwise or gradient elution according to a preselected pattern.

Another object of this invention is to provide an apparatus that controls operation of accessory equipment such as fraction cutters and analytical monitoring equipment in addition to controlling addition of eluting solutions to a chromatographic column.

Figure 1:
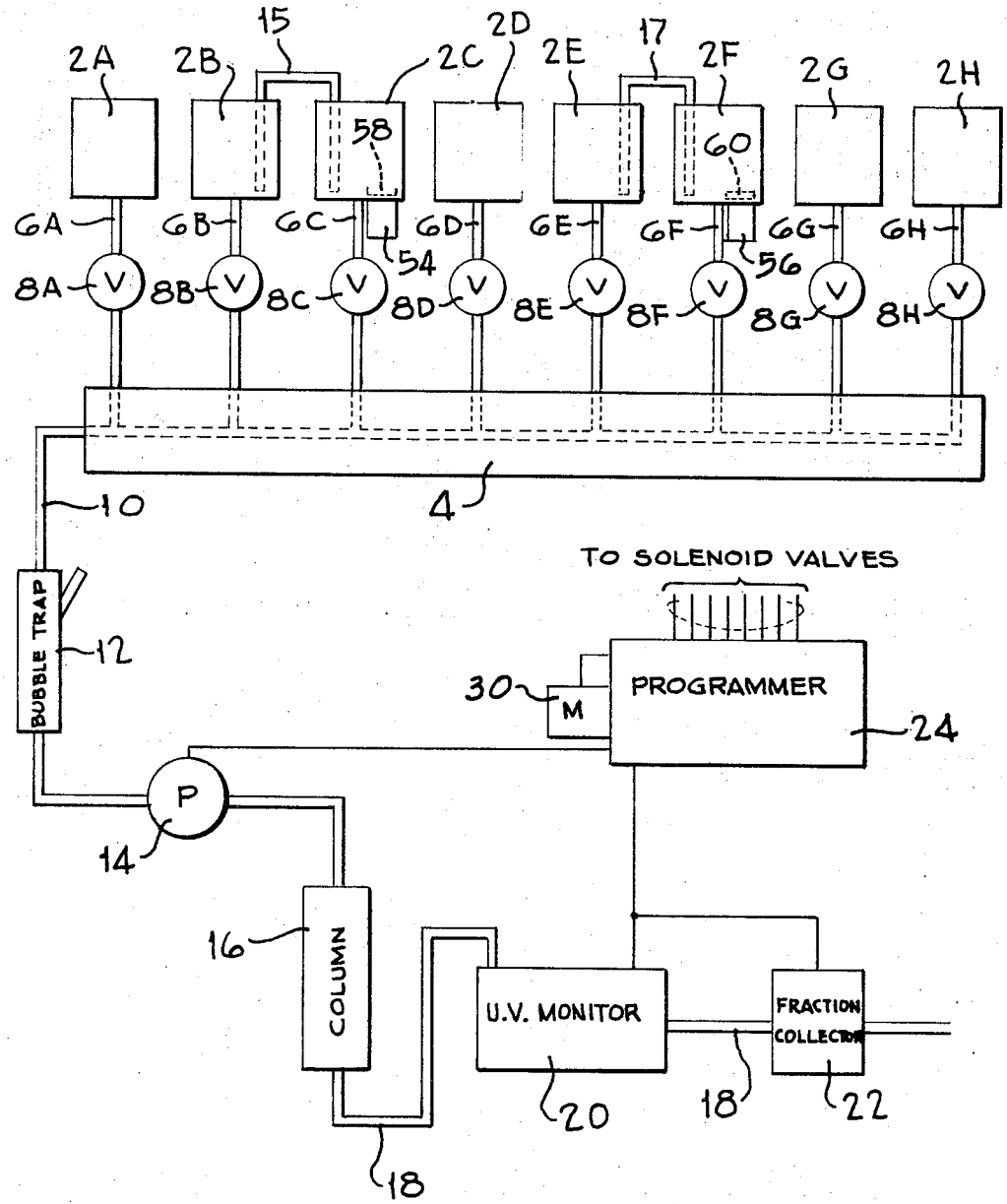
Figure 2:
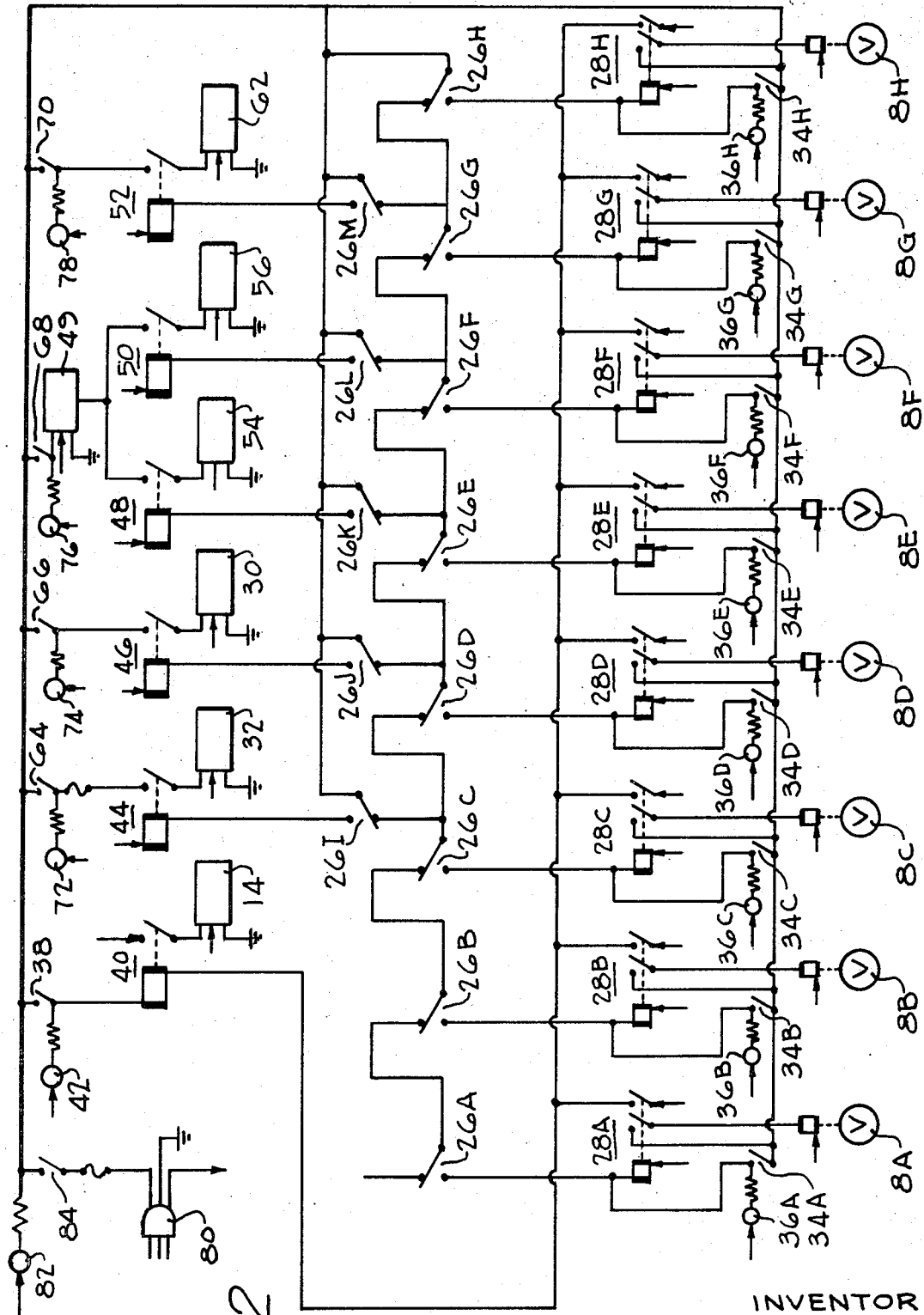

The above and still further objects, features and advantages of the present invention will be fully understood from the following description considered with reference to the accompanying drawings, wherein: FIG. 1 is a schematic representation of a typical assembled apparatus. FIG. 2 is an electrical schematic circuit diagram.

Referring now to the drawings in detail and first with respect to FIG. 1, the eluent programmer comprises a series of reservoirs 2A to 2H connected to manifold 4 by fluid lines 6A to 6H which pass through solenoid valves 8A to 8H. Fluid lines 6A to 6H merge in manifold 4 into fluid line 10 which then sequentially passes through bubble trap 12 and pump 14 before entering chromatographic column 16. Gradient additions to column 16 are facilitated through use of siphon tubes 15 and 17. Fluid line 18 is provided so that eluted fractions can be transported to accessory collecting and monitoring equipment such as ultraviolet monitor 20 and fraction collector 22. Programmer 24 is a commercially available compact, programming switch, that is, a dynamic, electrical control that can be pre-programmed to meet many application requirements. Basically, it is a drum actuated series of contacts. The actuators (cams) in the drum are individually spring-loaded, permitting movement along dove-tailed grooves to an active, or inactive position under any set of contacts. The drum has 60 parallel dove-tailed grooves on its external circumference. Programmer 24 is provided with programmer motor 30 and is electrically connected to the other parts of the apparatus as shown in FIGS. 1 and 2. The contacts in programmer 24, which are normally open, are shown in FIG. 2 as 26A to 26M. Each contact, 26A to 26A, controls a corresponding relay 28A to 28H, and each relay controls a corresponding solenoid valve 8A to 8H, a corresponding pilot light 36A to 36H, and relay 40 for pump 14. Relays 28A and 28H are also provided with manual switches 34A to 34H and relay 40 is provided with manual switch 38 and pilot light 42. Contacts 26I to 26M control relays 44, 46, 48, 50, and 52 respectively. Relay 44 controls outlet 32 for accessory equipment such as ultraviolet monitor 20 and fraction collector 22. Relay 46 controls programmer motor 30. Relays 48 and 50 control, through variable transformer 49, motors 54 and 56 for magnetic stirrers 58 and 60 in reservoirs 2C and 2F. Relay 52 controls outlet 62 for extra magnetic stirrer motors or other additional equipment or functions. Relays 44, 46, 48, 50 and 52 are also provided with manual switches 64, 66, 68 (for 48 and 50) and 70 and with pilot lights 72, 74, 76 (for 48 and 50) and 78. The apparatus is connected to a 120 v. AC source through electric plug 80 and is activated by toggle switch 84 which has its own indicating pilot light 82.

OPERATION OF THE APPARATUS FOR STEPWISE ADDITION OF ELUENTS

Siphon tubes 15 and 17 and operation of magnetic stirrers 58 and 60 are not needed for stepwise addition of eluents to column 16. Programmer 24 is prepared for operation by moving the actuators on the drum to positions that will open and close the appropriate relays to accomplish the purpose of the run, that is, to elute a sample from column 16 with a series of different solutions, to control the amount of each eluting solvent used by controlling the time that any particular solenoid valve, 8A to 8H, is open, and to control the other functions of the apparatus. The sample to be eluted is placed on column 16. Reservoirs 2A to 2H (or that number of the reservoirs corresponding to the number of different eluting solutions to be used) are each filled with an appropriate eluting solution. The drum on programmer 24 is manually positioned to close contact 26J and start programmer motor 30 and programmer 24. As the drum on programmer 24 rotates, each contact, 26A to 26H, closes in sequence and remains closed for a predetermined length of time, after which it opens and the next contact in sequence closes. As each contact closes, electric current is supplied to its corresponding relay (28A to 28H) which opens its correspond solenoid valve (8A to 8H), lights its corresponding pilot light (36A to 36H), and activates pump 14 through relay 40. When the drum of programmer 24 rotates to the point at which contact 26I closes, electrical current is supplied to relay 44 which activates outlet 32 for operation of accessory equipment. When magnetic stirrers and additional equipment are not used, the actuators on the programmer drum under contacts 26K, 26L and 26M are preset in inactive positions so that relays 48, 50 and 52 will not be activated. After the solution in the last reservoir in the predetermined sequence has been added to column 16, the contact controlling the solenoid connected to that reservoir opens, electric current to the corresponding relay and to relay 40 is cut off, the solenoid valve closes and pump 14 stops operating. At this stage in the rotation of the drum of programmer 24, the actuators under contacts 26I and 26J are in inactive positions thus opening these contacts, inactivating relays 44 and 46 and shutting off the accessory equipment 20 and 22 and programmer motor 30.

OPERATION OF THE APPARATUS TO MAKE A COMBINATION OF STEPWISE AND GRADIENT ADDITION OF ELUENTS

Essentially, this operation is very similar to that for the stepwise addition of eluents. However, siphon tubes 15 and 17 and magnetic stirrers 58 and 60 are needed for the gradient addition of eluents to column 16. The actuators under contacts 26I and 26J are in inactive posi- the stepwise run to make the necessary contacts to accomplish the purpose of the run. The sample is placed on column 16 and reservoirs 2A to 2H are filled with appropriate solutions. FIG. 1 shows an arrangement for a combination stepwise and gradient addition of eluents. In the arrangement shown, the gradient additions would flow from reservoirs 2C and 2F. In order to form a gradient the solutions in reservoirs 2C and 2F have a lower concentration of solute than those in reservoirs 2B and 2E. Siphon tubes 15 and 17 are filled with solution and placed as shown in FIG. 1. When solenoid valve 8C opens and the solution in 2C starts flowing through fluid line 6C, the solution in 2B is continuously siphoned into and mixed by magnetic stirrer 58 with the solution in 2C, thus gradually increasing the concentration of the eluent solution flowing through fluid line 6C to column 16 and accessory equipment 20 and 22. The operation just described in conjunction with the opening of 8C is repeated when solenoid valve 8F opens. In the combination stepwise and gradient addition of eluents, the actuators on the drum of programmer 24 that control contacts 26B and 26E are placed in inactive positions so that solenoid valves 8B and 8E do not open. With the exception of the variations just described the rest of the run is the same as for the stepwise addition of eluent solutions.

I claim:
1. An apparatus for automatically and reproducibly adding eluent solutions to a chromatographic column according to a preselected pattern and for automatically controlling the operation of accessory, eluate collecting and eluate monitoring equipment, comprising:
 (a) a plurality of reservoirs;
 (b) a plurality of solenoid valves, one of which is connected to each reservoir by a fluid line, said valves controlling the flow of eluent solution from each reservoir;
 (c) a common manifold connected by fluid lines to the solenoid valves;
 (d) a bubble trap for removing air bubbles in the flowing eluent solution, a pump, a chromatographic column, and eluate monitoring and fraction collecting equipment connected in series to each other and to the chromatographic column by fluid lines; and
 (e) programming means electrically connected to the solenoid valves, the pump, accessory and monitoring equipment by a plurality of circuits and relays.

2. An apparatus for automatically and reproducibly adding to a chromatographic column a preselected combination of stepwise and gradient eluent addition patterns and for automatically controlling operation of accessory, eluate collecting and eluate monitoring equipment, comprising:
 (a) a plurality of reservoirs;
 (b) a number of siphon tubes equal to the number of desired gradients, each of said siphon tubes connecting two adjacent reservoirs for siphoning the contents of one reservoir into that of the second while concurrently draining the second reservoir;
 (c) a number of magnetic stirrers and motors equal to one-half the number of siphon tubes, said magnetic stirrers being located in the second of any two adjacent reservoirs connected by a siphon tube to mix the solution in the second reservoir with the solution being siphoned into it from the first reservoir;
 (d) a plurality of solenoid valves to control the flow of eluent solution from the reservoirs;
 (e) a manifold connected to the reservoirs by fluid lines that pass through the aforesaid solenoid valves;
 (f) a bubble trap, a pump, a chromatographic column, eluate monitoring and fraction collecting equipment connected in series to each other and to the manifold; and
 (g) programming means electrically connected to the solenoid valves, the pump, the accessory and monitoring equipment by a series of circuits and relays.

References Cited
UNITED STATES PATENTS

| 3,373,872 | 3/1968 | Hadina | 210—198 C |
| 3,598,995 | 8/1971 | Inove et al. | 210—198 C X |
| 3,649,203 | 3/1972 | Schneider | 210—198 C X |

JOHN ADEE, Primary Examiner

U.S. Cl. X.R.
73—61.1 C